(12) United States Patent
Pai et al.

(10) Patent No.: US 10,985,631 B1
(45) Date of Patent: Apr. 20, 2021

(54) MICROTURBINE ELECTRICITY GENERATION SYSTEM AND ELECTRICITY MANAGEMENT METHOD THEREOF

(71) Applicant: GONGIN PRECISION INDUSTRIES CO., LTD., Kaohsiung (TW)

(72) Inventors: Fu-Sheng Pai, Tainan (TW); Yo-Hsin Su, Kaohsiung (TW)

(*) Notice: Subject to any disclaimer, the term of this patent is extended or adjusted under 35 U.S.C. 154(b) by 0 days.

(21) Appl. No.: 16/697,341

(22) Filed: Nov. 27, 2019

(30) Foreign Application Priority Data

Nov. 27, 2019 (TW) .................................. 108143199

(51) Int. Cl.
*H02K 7/18* (2006.01)
*H02M 5/42* (2006.01)
*H02P 9/02* (2006.01)

(52) U.S. Cl.
CPC ................ *H02K 7/18* (2013.01); *H02M 5/42* (2013.01); *H02P 9/02* (2013.01)

(58) Field of Classification Search
CPC ............... H02K 7/18; H02M 5/42; H02P 9/02
See application file for complete search history.

(56) References Cited

U.S. PATENT DOCUMENTS

| | | | | |
|---|---|---|---|---|
| 8,097,970 B2 * | 1/2012 | Hyvarinen | ............... | H02J 3/381 290/44 |
| 9,118,184 B2 * | 8/2015 | Wagoner | ............... | H02H 7/1216 |
| 2007/0121353 A1 * | 5/2007 | Zhang | ................... | H02J 3/381 363/39 |
| 2009/0322081 A1 * | 12/2009 | Wagoner | ................. | H02J 3/386 290/44 |
| 2009/0322082 A1 * | 12/2009 | Wagoner | ............... | H02M 5/458 290/44 |
| 2009/0322083 A1 * | 12/2009 | Wagoner | ................. | H02P 9/006 290/44 |
| 2010/0127650 A1 * | 5/2010 | Peterson | ................. | H02P 31/00 318/400.26 |
| 2010/0188055 A1 * | 7/2010 | Patterson | ............ | H02P 29/0243 322/90 |
| 2010/0320949 A1 * | 12/2010 | Fotherby | ............... | H02M 7/797 318/400.26 |
| 2011/0074151 A1 * | 3/2011 | Burra | .................... | F03D 7/0284 290/44 |
| 2015/0035284 A1 * | 2/2015 | Yang | ....................... | H02M 5/42 290/55 |
| 2017/0047856 A1 * | 2/2017 | Luscher | .................. | H02M 1/32 |
| 2017/0310232 A1 * | 10/2017 | De Hoog | ............. | H02J 13/0006 |

* cited by examiner

*Primary Examiner* — Sean Gugger
(74) *Attorney, Agent, or Firm* — Hammer & Associates, P.C.

(57) ABSTRACT

A method for manufacturing a smart card includes: planting a solder ball on the secure chip solder pad of the main circuit board; according to the position of the secure chip solder pad on the main circuit board, milling out a groove on the substrate on which the main circuit board is packed, such that the solder ball on the secure chip solder pad is visible at the bottom of the groove; packing the secure chip module into the groove, and by use of the solder ball on the secure chip solder pad, mounting the secure chip module onto the main circuit board. The method is capable of improving the quality of the wiring of the main circuit board; and increasing the scalability of the smart card.

9 Claims, 5 Drawing Sheets

MICROTURBINE ELECTRICITY GENERATION SYSTEM AND ELECTRICITY MANAGEMENT METHOD THEREOF

CROSS-REFERENCE TO RELATED APPLICATION

This application claims priority of Taiwanese Patent Application No. 108143199, filed on Nov. 27, 2019.

FIELD

The disclosure relates to electricity generation, and more particularly to a microturbine electricity generation system and an electricity management method thereof.

BACKGROUND

A conventional microturbine electricity generation system includes a microturbine generator, and an electricity converter coupled to the microturbine generator. The microturbine generator converts fuel into alternating current (AC) supply electricity that has a frequency of several hundred Hertz (Hz) (e.g., 750 Hz). The electricity converter undergoes supply-to-output AC conversion, which converts the AC supply electricity into AC output electricity that has a frequency of 50 Hz or 60 Hz, and that is to be outputted to the mains electricity grid.

Since the conventional microturbine electricity generation system includes only one electricity converter, the electricity converter must use high current switches that have high conduction resistances to be able to endure high current stress, resulting in high power conversion loss of the electricity converter and low electricity generation efficiency of the conventional microturbine electricity generation system. In addition, when the electricity converter is not in a normal state, the conventional microturbine electricity generation system cannot work, resulting in low utilization thereof.

SUMMARY

Therefore, an object of the disclosure is to provide a microturbine electricity generation system that can alleviate the drawbacks of the prior art, and an electricity management method thereof.

According to an aspect of the disclosure, the microturbine electricity generation system includes a microturbine generator, a generator controller, an electricity conversion device and a converter controller. The microturbine generator is for receiving fuel, and is operable, based on a generator control signal, to convert or not to convert the fuel into alternating current (AC) supply electricity. The generator controller is coupled to the microturbine generator, generates the generator control signal for receipt by the microturbine generator, and detects output power of the microturbine generator to generate a generator detection signal. The electricity conversion device has an input terminal that is coupled to the microturbine generator for receiving the AC supply electricity therefrom, and an output terminal, and is operable to convert or not to convert the AC supply electricity into AC output electricity that is outputted at the output terminal thereof. The electricity conversion device includes a plurality of electricity converters. Each of the electricity converters is coupled between the input and output terminals of the electricity conversion device, is for receiving a respective converter control signal, and is operable, based on at least the respective converter control signal, to convert or not to convert at least some of the AC supply electricity into at least some of the AC output electricity. The converter controller is coupled to the generator controller for receiving the generator detection signal therefrom, is further coupled to the electricity converters, and generates, based on at least the generator detection signal, the converter control signals for receipt by the electricity converters.

In one embodiment, each of the electricity converters further detects whether itself is in a normal state to generate a converter detection signal, and is operable, based on the respective converter control signal and the converter detection signal, to convert or not to convert the at least some of the AC supply electricity into the at least some of the AC output electricity. The converter controller further receives the converter detection signals respectively from the electricity converters, and generates the converter control signals based on the generator detection signal and the converter detection signals. The converter controller obtains, based on the converter detection signals, a number of the electricity converter(s) that is detected to be in the normal state to generate an indication signal, and generates the converter control signals in such a way that, when the number indicated by the indication signal is non-zero, for the electricity converter(s) which is detected to be in the normal state, at least one of the electricity converter(s) takes part in the supply-to-output AC conversion.

According to another aspect of the disclosure, the electricity management method is to be implemented by the converter controller of the microturbine electricity generation system of said one embodiment. A number of the electricity converters of the electricity conversion device is greater than or equal to three. The electricity management method is performed by the converter controller when the number indicated by the indication signal is greater than or equal to three, and includes: (A) receiving the generator detection signal from the generator controller; and (B) generating the converter control signals based on the generator detection signal and the converter detection signals. (B) includes: (B1) determining whether $Pconv \leq N \times Pb$, where Pconv is the output power indicated by the generator detection signal, where N is the number indicated by the indication signal, and where Pb is a predetermined threshold power value that is smaller than a rated value of output power of each of the electricity converters of the electricity conversion device; (B2) when the determination in (B1) is positive, generating the converter control signals in such a way that, for the electricity converters that are detected to be in the normal state, a number (L) of the electricity converters takes part in the supply-to-output AC conversion, one of the electricity converters that take part in the supply-to-output AC conversion provides the output power of $Pconv-(L-1) \times Pb$, and each of the other one(s) of the electricity converters that take part in the supply-to-output AC conversion provides the output power of Pb, where L is a smallest integer greater than or equal to $Pconv/Pb$; and (B3) when the determination in (B1) is negative, generating the converter control signals in such a way that the electricity converters which are detected to be in the normal state all take part in the supply-to-output AC conversion, and each provide the output power of $Pconv/N$.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
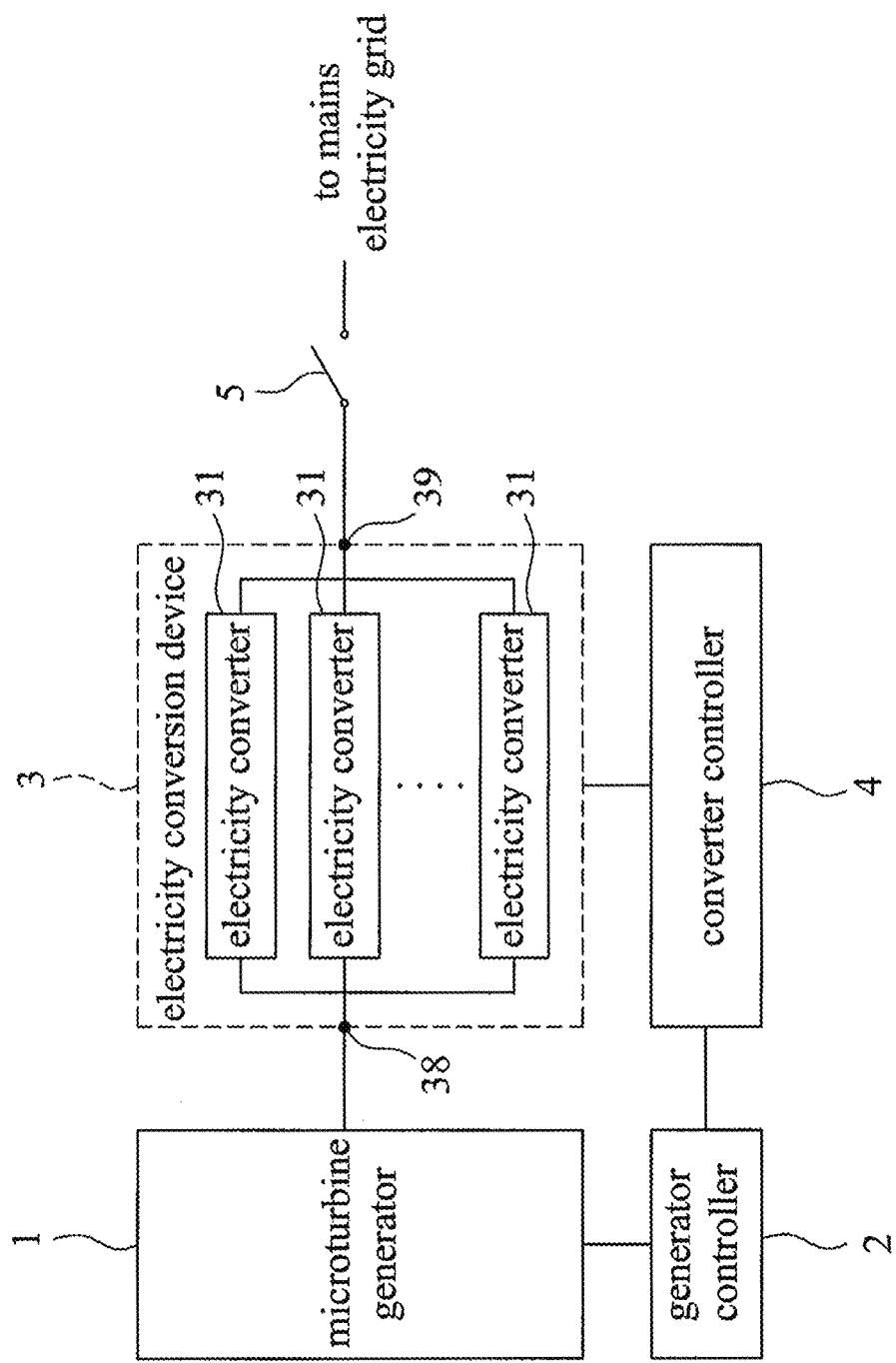
FIG. 1 is a circuit block diagram illustrating an embodiment of a microturbine electricity generation system according to the disclosure.

Referring to FIG. 1, an embodiment of a microturbine electricity generation system according to the disclosure includes a microturbine generator 1, a generator controller 2, an electricity conversion device 3, a converter controller 4 and a main switch 5.

The microturbine generator 1 is for receiving fuel, and is operable, based on a generator control signal, to convert or not to convert the fuel into alternating current (AC) supply electricity.

The generator controller 2 is coupled to the microturbine generator 1, generates the generator control signal for receipt by the microturbine generator 1, and periodically detects output power of the microturbine generator 1 to generate a generator detection signal.

The electricity conversion device 3 has an input terminal 38 that is coupled to the microturbine generator 1 for receiving the AC supply electricity therefrom, and an output terminal 39, and is operable to convert or not to convert the AC supply electricity into AC output electricity that is outputted at the output terminal 39 thereof. In this embodiment, the AC output electricity has a frequency (e.g., 50 Hz or 60 Hz) lower than a frequency (e.g., 750 Hz) of the AC supply electricity.

The electricity conversion device 3 includes at least three electricity converters 31 in this embodiment. Each of the electricity converters 31 is coupled between the input and output terminals 38, 39 of the electricity conversion device 3, is for receiving a respective converter control signal, and is operable, based on at least the respective converter control signal, to convert or not to convert at least some of the AC supply electricity into at least some of the AC output electricity.

In this embodiment, for each of the electricity converters 31, the respective converter control signal indicates a target power value. The electricity converter 31 further detects whether itself is in a normal state to generate a converter detection signal, and is operable, based on the respective converter control signal and the converter detection signal, to convert or not to convert the at least some of the AC supply electricity into the at least some of the AC output electricity. When the converter detection signal indicates that the electricity converter 31 is in the normal state (i.e., the electricity converter 31 is detected to be in the normal state) while the target power value indicated by the respective converter control signal is non-zero, the electricity converter 31 converts the at least some of the AC supply electricity into the at least some of the AC output electricity to provide output power of the target power value indicated by the respective converter control signal. Otherwise, the electricity converter 31 does not convert the at least some of the AC supply electricity into the at least some of the AC output electricity.

Figure 2:
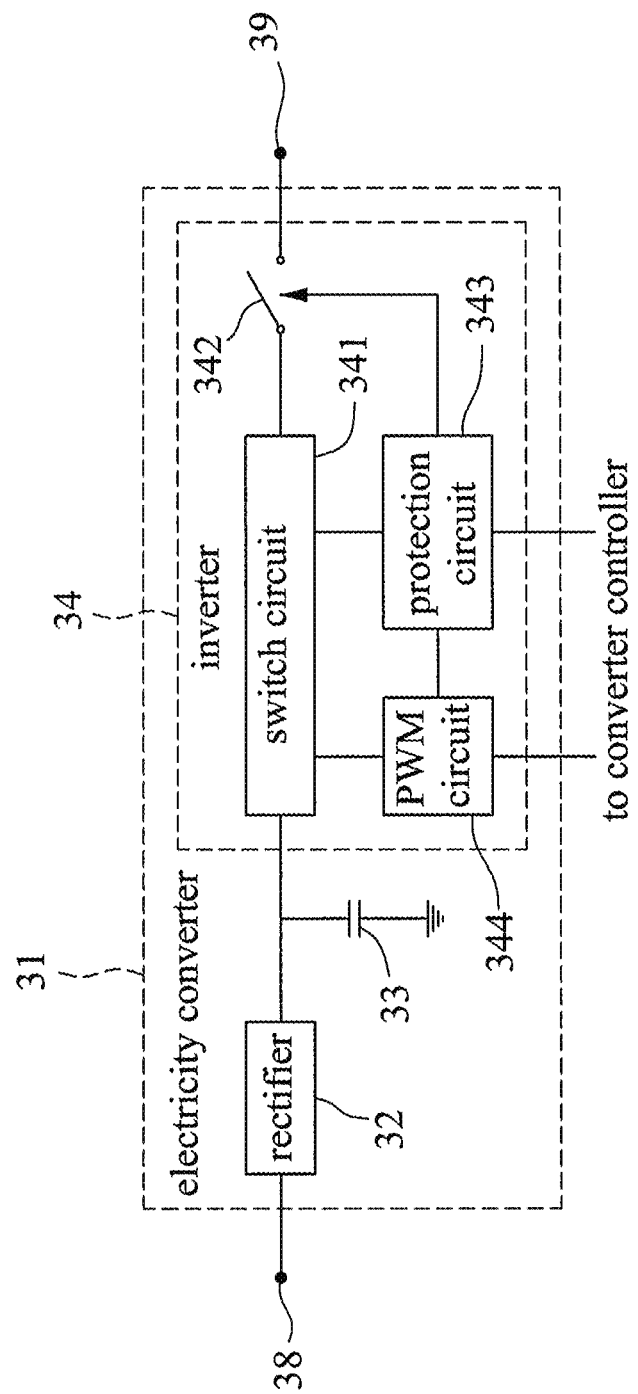
FIG. 2 is a circuit block diagram illustrating each of multiple electricity converters of the embodiment.

Referring to FIGS. 1 and 2, in this embodiment, each of the electricity converters 31 includes a rectifier 32, a capacitor 33 and an inverter 34. The rectifier 32 is coupled to the input terminal 38 of the electricity conversion device 3 for receiving the at least some of the AC supply electricity therefrom, and rectifies the at least some of the AC supply electricity to generate direct current (DC) intermediate electricity. The capacitor 33 is coupled to the rectifier 32 for temporarily storing the DC intermediate electricity. The inverter 34 is coupled to a common node of the rectifier 32 and the capacitor 33 for receiving the DC intermediate electricity therefrom, and is for further receiving the respective converter control signal. The inverter 34 detects whether itself can operate properly to generate the converter detection signal. The converter detection signal indicates that the electricity converter is in the normal state when the inverter 34 detects that itself can operate properly, and indicates that the electricity converter is not in the normal state otherwise. The inverter 34 is operable, based on the respective converter control signal and the converter detection signal, to convert or not to convert the DC intermediate electricity into the at least some of the AC output electricity.

In this embodiment, for each of the electricity converters 31, the inverter 34 includes a switch circuit 341, an output switch 342, a protection circuit 343 and a pulse width modulation (PWM) circuit 344. The switch circuit 341 is coupled to the common node of the rectifier 32 and the capacitor 33 for receiving the DC intermediate electricity therefrom, is for further receiving a PWM signal, and includes a plurality of switches (not shown). Based on the PWM signal, the switches of the switch circuit 341 alternate between conduction and non-conduction to convert the DC intermediate electricity into the at least some of the AC output electricity, or do not alternate to not convert and to remain in non-conduction. The output switch 342 is coupled to the switch circuit 341 for receiving the at least some of the AC output electricity therefrom, is further coupled to the output terminal 39 of the electricity conversion device 3, and is for further receiving a switch control signal. The output switch 342 is operable to switch between conduction and non-conduction based on the switch control signal, and permits transmission of the at least some of the AC output electricity therethrough to the output terminal of the electricity conversion device 3 when conducting. The protection circuit 343 is coupled, to the switch circuit 341 and the output switch 342, senses a plurality of operating parameters (including a voltage, a current and a switching frequency) of each of the switches of the switch circuit 341, and generates the converter detection signal based on the operating parameters of the switches of the switch circuit 341. The converter detection signal indicates that the electricity converter 31 is in the normal state when each of the operating parameters of the switches of the switch circuit 341 falls within a predetermined and corresponding range (i.e., the inverter 34 can operate properly), and indicates that the electricity converter 31 is not in the normal state otherwise. The protection circuit 343 generates the switch control signal for receipt by the output switch 342 based on the converter detection signal in such a way that the output switch 342 conducts when the converter detection signal indicates that the electricity converter 31 is in the normal state, and does not conduct otherwise, thereby preventing damage to the microturbine electricity generation system of this embodiment and mains electricity grid caused by short circuiting, overloading, voltage abnormality and frequency abnormality of the switch circuit 341. The PWM circuit 344 is coupled to the switch circuit 341 and the protection circuit 343, is for receiving the converter detection signal from the protection circuit 343, and is for further receiving the respective converter control signal. The PWM circuit 344 generates the PWM signal based on the respective converter control signal and the converter detection signal in such a way that: (a) the switch circuit 341 converts the DC intermediate electricity into the at least some of the AC output electricity when the converter detection signal indicates that the electricity converter 31 is in the normal state while the target power value indicated by the respective converter control signal is non-zero; and (b) the switch circuit 341 does not convert the DC intermediate electricity into the at least some of the AC output electricity otherwise. Therefore, when none of the electricity converters 31 is detected to be in the normal state, each of the electricity converters 31 does not convert the at least some of the AC supply electricity into the at least some of the AC output electricity, and the AC supply electricity is not converted into the AC output electricity. When at least one of the electricity converters 31 is detected to be in the normal state (each referred to as the normal electricity converter 31 hereinafter), the AC supply electricity is converted into the AC output electricity, and at least one of the normal electricity converter(s) 31 takes part in the conversion of the AC supply electricity into the AC output electricity. This conversion will be referred to as the supply-to-output AC conversion hereinafter.

The main switch 5 is coupled to the output terminal 39 of the electricity conversion device 3 for receiving the AC output electricity therefrom, is adapted to be further coupled to the mains electricity grid, and permits transmission of the AC output electricity therethrough to the mains electricity grid when conducting. In this embodiment, the main switch 5 is a no-fuse breaker that can be manually switched between conduction and non-conduction, and that can automatically switch to non-conduction when a current flowing therethrough exceeds a predetermined current upper limit.

The converter controller 4 (e.g., an embedded computer) is coupled to the generator controller 2 for receiving the generator detection signal therefrom, is further coupled to the protection circuits 343 of the electricity converters 31 for receiving the converter detection signals respectively therefrom, and is further coupled to the PWM circuits 344 of the electricity converters 31. The converter controller 4 generates, based on the generator detection signal and the converter detection signals, the converter control signals for receipt by the PWM circuits 344 of the electricity converters 31.

In this embodiment, the converter controller 4 obtains a number of the normal electricity converter (s) 31 based on the converter detection signals to generate an indication signal. The generator controller 2 receives the indication signal from the converter controller 4, and generates the generator control signal based on the indication signal in such a way that: (a) when the number indicated by the indication signal is non-zero, the microturbine generator 1 converts the fuel into the AC supply electricity to provide the output power which is smaller than or equal to a product of the number indicated by the indication signal and a rated value of output power of each of the electricity converters 31; and (b) when the number indicated by the indication signal is zero, the microturbine generator 1 does not convert the fuel into the AC supply electricity.

Figure 3:
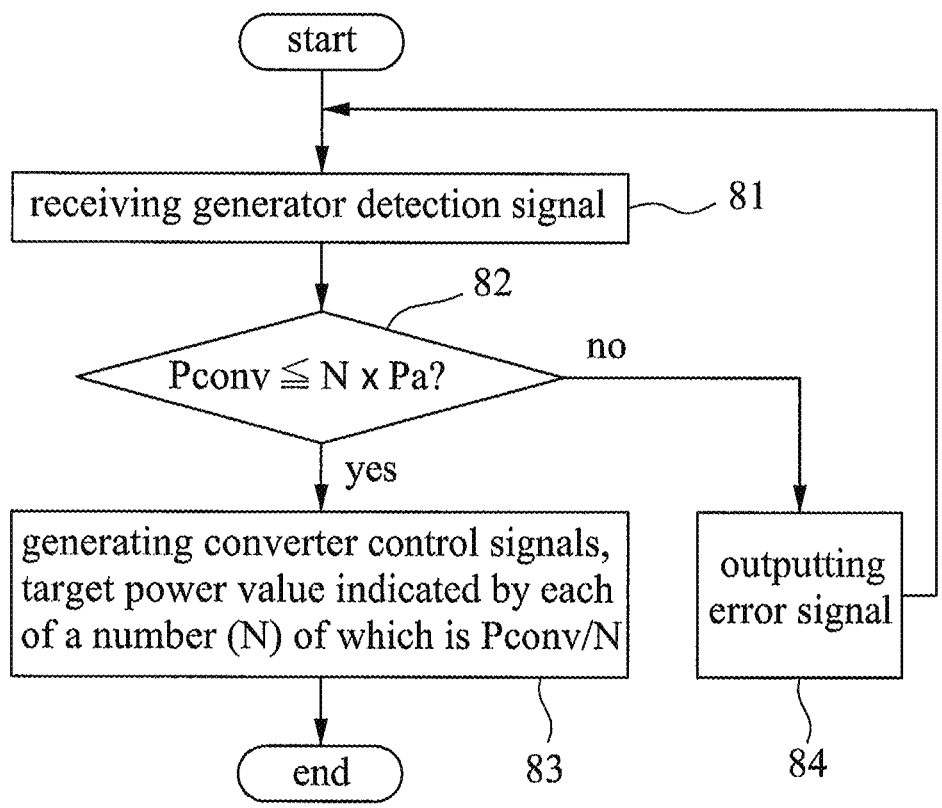
FIG. 3 is a flow chart illustrating a first electricity management method performed by a converter controller of the embodiment.

Referring to FIGS. 1 and 3, in this embodiment, when the number indicated by the indication signal is one or two, a first electricity management method that includes the following steps 81-84 is periodically performed by the converter controller 4 to generate the converter control signals.

In step 81, the converter controller 4 receives the generator detection signal from the generator controller 2.

In step 82, the converter controller 4 determines whether Pconv≤N×Pa, where Pconv is the output power indicated by the generator detection signal, where N is the number indicated by the indication signal, and where Pa is the rate value of the output power of each of the electricity converters 31. If positive, Pconv is reasonable, and the flow proceeds to step 83. Otherwise, the flow goes to step 84.

In step 83, the converter controller 4 generates the converter control signals. For the converter control signal(s) that corresponds to the normal electricity converter(s) 31, the target power value indicated by each of the converter control signal(s) is Pconv/N. Therefore, the normal electricity converter(s) 31 all takes part in the supply-to-output AC conversion, and each provides the output power of Pconv/N.

In step 84, the converter controller 4 outputs an error signal for receipt by the generator controller 2. The error signal enables the generator controller 2 to detect the output power of the microturbine generator 1 again to generate the generator detection signal. Then, the flow goes back to step 81.

Figure 4:
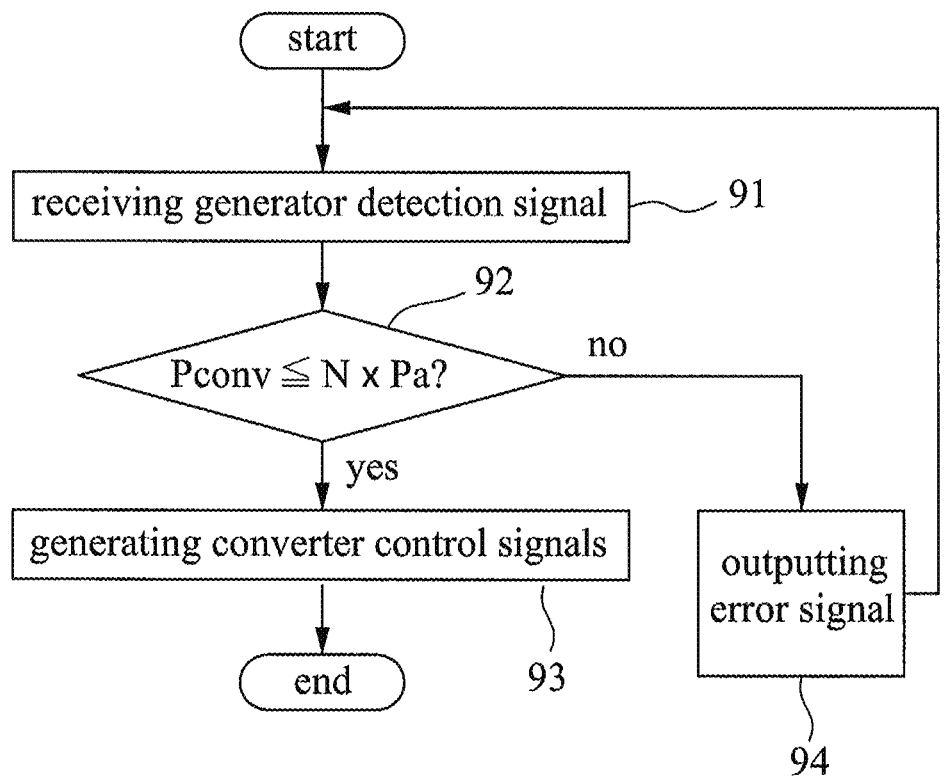
FIGS. 4 and 5 are flow charts illustrating a second electricity management method performed by the converter controller.
Figure 5:
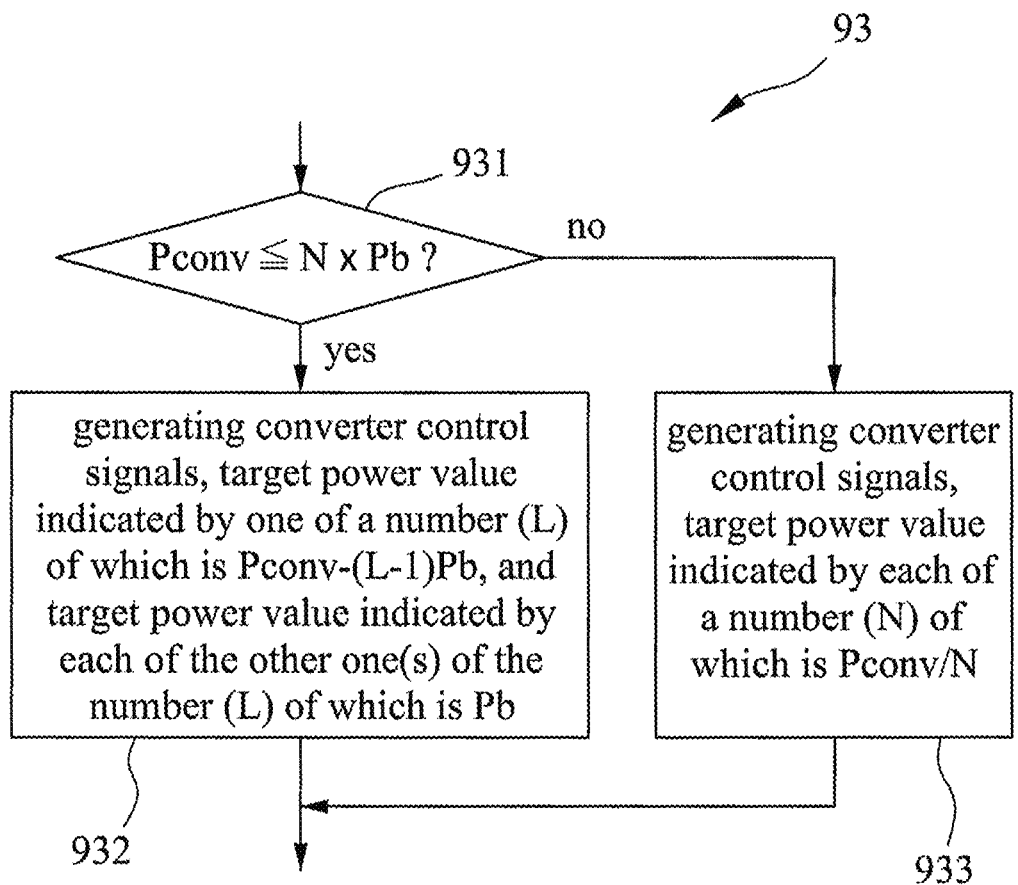

Referring to FIGS. 1, 4 and 5, in this embodiment, when the number indicated by the indication signal is greater than or equal to three, a second electricity management method that includes the following steps 91-94 is periodically performed by the converter controller 4 to generate the converter control signals.

In step 91, the converter controller 4 receives the generator detection signal from the generator controller 2.

In step 92, the converter controller 4 determines whether Pconv≤N×Pa. If positive, Pconv is reasonable, and the flow proceeds to step 93. Otherwise, the flow goes to step 94.

In step 93, the converter controller 4 generates the converter control signals based on the generator detection signal and the converter detection signals.

Step 93 includes the following sub-steps 931-933.

In sub-step 931, the converter controller 4 determines whether Pconv NxPb, where Pb is a predetermined threshold power value that is smaller than the rated value of the output power of each of the electricity converters 31. In an example, Pb=c×Pa, where c is a constant that falls within a range of 0.8 to 0.9. If positive, the flow proceeds to sub-step 932. Otherwise, the flow goes to sub-step 933.

In sub-step 932, the converter controller 4 generates the converter control signals. For the converter control signals that respectively correspond to the normal electricity converters 31, the target power value indicated by each of a number (L) of the converter control signals is non-zero, and the target power vale indicated by each of the remaining ones of the converter control signals is zero, where L is a smallest integer greater than or equal to Pconv/Pb. For the number (L) of the converter control signals, the target power value indicated by one of the converter control signals is Pconv−(L−1)×Pb, and the target power value indicated by each of the other one(s) of the converter control signals is Pb. Therefore, for the normal electricity converters 31, a number (L) of the normal electricity converters 31 takes part in the supply-to-output AC' conversion, one of the normal electricity converters 31 that take part in the supply-to-output AC conversion provides the output power of Pconv−(L−1)×Pb, and each of the other one(s) of the normal electricity converters 31 that take part in the supply-to-output AC conversion provides the output power of Pb. In an example where N=3, when Pconv Pb, L=1, the target power values that are indicated by the converter control signals which correspond to the normal electricity converters 31 are respectively Pconv, 0 and 0, and one of the normal electricity converters 31 takes part in the supply-to-output AC conversion, and provides the output power of Pconv; when Pb<Pconv≤2×Pb, L=2, the target power values that are indicated by the converter control signals which correspond to the normal electricity converters 31 are respectively Pconv-Pb, Pb and 0, and two of the normal electricity converters 31 take part in the supply-to-output AC conversion, and provide the output power of Pconv-Pb and Pb; and when 2×Pb<Pconv<3×Pb, L=3, the target power values that are indicated by the converter control signals which correspond to the normal electricity converters 31 are respectively Pconv−2×Pb, Pb and Pb, and all of the normal electricity converters 31 take part in the supply-to-output AC conversion, and provide the output power of Pconv−2×Pb, Pb and Pb.

In sub-step 933, the converter controller 4 generates the converter control signals. For the converter control signals that respectively correspond to the normal electricity converters 31, the target power value indicated by each of the converter control signals is Pconv/N. Therefore, the normal electricity converters 31 all take part in the supply-to-output AC conversion, and each provide the output power of Pconv/N.

In step 94, the converter controller 4 outputs the error signal for receipt by the generator controller 2. Therefore, the generator controller 2 detects the output power of the microturbine generator 1 again to generate the generator detection signal in response to the receipt of the error signal. Then, the flow goes back to step 91.

Referring to FIGS. 1 and 2, in view of the above, in this embodiment, since the microturbine electricity generation system includes at least three electricity converters 31, current stress endured by each of the electricity converters 31 can be low. Therefore, the switches of the electricity converters 31 can have low conduction resistances, resulting in low power conversion loss of a combination of the electricity converters 31 and high electricity generation efficiency of the microturbine electricity generation system. In addition, the microturbine electricity generation system can still work even some of the electricity converter 31 are not in the normal state, resulting in high utilization of the microturbine electricity generation system. Moreover, for each of the electricity converters 31, conversion efficiency thereof is better when the output power thereof is equal to the predetermined threshold power value (i.e., Pb) than when the output power thereof is equal to its rated value (i.e., Pa). The electricity generation efficiency of the microturbine electricity generation system can be further enhanced by virtue of the second electricity management method, in which the output power of each of the normal electricity converters 31 that take part in the supply-to-output AC conversion is as close to the predetermined threshold power value (i.e., Pb) as possible.

It should be noted that, in another embodiment, the electricity conversion device 3 may includes two electricity converters 31, and the converter controller 4 may omit the performance of the second electricity management method.

It should also be noted that, in yet another embodiment, for each of the electricity converters 31, the protection circuit 343 may be further coupled to the mains electricity grid, and may detect whether the mains electricity grid is in a normal state to generate a grid detection signal. For example, the protection circuit 343 senses a plurality of operating parameters (including a voltage and a frequency) of the mains electricity grid, and generates the grid detection signal based on the operating parameters of the mains electricity grid. The grid detection signal indicates that the mains electricity grid is in the normal state when each of the operating parameters of the mains electricity grid falls within a predetermined and respective range, and indicates that the mains electricity grid is not in the normal state otherwise. The protection circuit 343 may generate the switch control signal based on the converter detection signal and the grid detection signal in such a way that the output switch 342 conducts when both of the switch circuit 341 and the mains electricity grid are detected to be in the normal state, and does not conduct otherwise, thereby further preventing islanding of the microturbine electricity generation system.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A microturbine electricity generation system comprising:
   a microturbine generator for receiving fuel, and operable, based on a generator control signal, to convert or not to convert the fuel into alternating current (AC) supply electricity;
   a generator controller coupled to said microturbine generator, generating the generator control signal for receipt by said microturbine generator, and detecting output power of said microturbine generator to generate a generator detection signal;
   an electricity conversion device having an input terminal that is coupled to said microturbine generator for receiving the AC supply electricity therefrom, and an output terminal, and operable to perform or not to perform supply-to-output AC conversion that converts the AC supply electricity into AC output electricity outputted at said output terminal thereof, said electricity conversion device including a plurality of electricity converters, each of said electricity converters being coupled between said input and output terminals of said electricity conversion device, being for receiving a respective converter control signal, detecting whether said electricity converter is in a normal state to generate a converter detection signal, and being operable, based on the respective converter control signal and the converter detection signal, to convert or not to convert at least some of the AC supply electricity into at least some of the AC output electricity; and
   a converter controller coupled to said generator controller for receiving the generator detection signal therefrom, further coupled to said electricity converters for receiving the converter detection signals respectively therefrom, and generating, based on the generator detection signal and the converter detection signals, the converter control signals for receipt by said electricity converters;

wherein said converter controller
- obtains, based on the converter detection signals, a number of said electricity converter(s) that is (are) detected to be in the normal state to generate an indication signal,
- generates the converter control signals in such a way that, when the number indicated by the indication signal is non-zero, for said electricity converter(s) detected to be in the normal state, at least one of said electricity converter(s) takes part in the supply-to-output AC conversion, and
- outputs an error signal when Pconv>N×Pa, where Pconv is the output power indicated by the generator detection signal, where N is the number indicated by the indication signal, and where Pa is a rated value of output power of each of said electricity converters of said electricity conversion device;

wherein said generator controller is for receiving the error signal from said converter controller, and detects the output power of said microturbine generator again to generate the generator detection signal in response to the receipt of the error signal.

2. The microturbine electricity generation system of claim 1, further comprising:
a main switch coupled to said output terminal of said electricity conversion device for receiving the AC output electricity therefrom, adapted to be further coupled to a mains electricity grid, and permitting transmission of the AC output electricity therethrough to the mains electricity grid when conducting.

3. The microturbine electricity generation system of claim 1, wherein each of said electricity converters includes:
a rectifier coupled to said input terminal of said electricity conversion device for receiving the at least some of the AC supply electricity therefrom, and rectifying the at least some of the AC supply electricity to generate direct current (DC) intermediate electricity;
a capacitor coupled to said rectifier for temporarily storing the DC intermediate electricity; and
an inverter coupled to a common node of said rectifier and said capacitor for receiving the DC intermediate electricity therefrom, further coupled to said converter controller for receiving the respective converter control signal therefrom, and operable, based on at least the respective converter control signal, to convert or not to convert the DC intermediate electricity into the at least some of the AC output electricity.

4. The microturbine electricity generation system of claim 1, wherein each of said electricity converters:
converts the at least some of the AC supply electricity into the at least some of the AC output electricity to provide the output power of a target power value indicated by the respective converter control signal when the converter detection signal indicates that said electricity converter is in the normal state while the target power value indicated by the respective converter control signal is non-zero; and
does not convert the at least some of the AC supply electricity into the at least some of the AC output electricity otherwise.

5. The microturbine electricity generation system of claim 1, wherein:

said generator controller receives the indication signal from said converter controller, and generates the generator control signal based on the indication signal in such a way that
when the number indicated by the indication signal is non-zero, said microturbine generator converts the fuel into the AC supply electricity to provide the output power smaller than or equal to a product of the number indicated by the indication signal and the rated value of the output power of each of said electricity converters, and
when the number indicated by the indication signal is zero, said microturbine generator does not convert the fuel into the AC supply electricity.

6. The microturbine electricity generation system of claim 1, wherein said converter controller generates the converter control signals in such a way that, when the number indicated by the indication signal is one or two, all of said electricity converter(s) detected to be in the normal state takes part in the supply-to-output AC conversion, and each of said electricity converter(s) detected to be in the normal state provides the output power of Pconv/N.

7. The microturbine electricity generation system of claim 1, wherein:
a number of said electricity converters is greater than or equal to three; and
said converter controller generates the converter control signals in such a way that, when the number indicated by the indication signal is greater than or equal to three, for said electricity converters detected to be in the normal state,
if Pconv≤N×Pb, a number (L) of said electricity converters takes part in the supply-to-output AC conversion, one of said electricity converters that take part in the supply-to-output AC conversion provides the output power of Pconv−(L−1)×Pb and each of the other one(s) of said electricity converters that take part in the supply-to-output AC conversion provides output power of Pb, where Pb is a predetermined threshold power value smaller than the rated value of the output power of each of said electricity converters of said electricity conversion device, and where L is a smallest integer greater than or equal to Pconv/Pb, and
if Pconv>N×Pb, all of said electricity converters take part in the supply-to-output AC conversion, and each of said electricity converters provides output power of Pconv/N.

8. An electricity management method to be implemented by a converter controller of a microturbine electricity generation system, the microturbine electricity generation system further including a microturbine generator, a generator controller and an electricity conversion device, the microturbine generator being for receiving fuel and being operable, based on a generator control signal, to convert or not to convert the fuel into alternating current (AC) supply electricity, the generator controller being coupled to the microturbine generator, generating the generator control signal for receipt by the microturbine generator, and detecting output power of the microturbine generator to generate a generator detection signal, the electricity conversion device having an output terminal and an input terminal that is coupled to the microturbine generator for receiving the AC supply electricity therefrom, and being operable to perform or not to perform supply-to-output AC conversion that converts the AC supply electricity into AC output electricity outputted at the output terminal thereof, the electricity conversion device including at least three electricity converters, each of the electricity converters being coupled between the input and output terminals of the electricity conversion device, being for receiving a respective converter control signal, detecting whether the electricity converter is in a normal state to generate a converter detection signal, and being operable, based on the respective converter control signal and the converter detection signal, to convert or not to convert at least some of the AC supply electricity into at least some of the AC output electricity, the converter controller being coupled to the generator controller, being further coupled to the electricity converters for receiving the converter detection signals respectively therefrom, and obtaining, based on the converter detection signals, a number of the electricity converter(s) that is (are) detected to be in the normal state to generate an indication signal, said electricity management method being performed by the converter controller when the number indicated by the indication signal is greater than or equal to three, and comprising:

(A) receiving the generator detection signal from the generator controller; and (B) generating the converter control signals for receipt by the electricity converters based on the generator detection signal and the converter detection signals;

wherein (B) includes (B1) determining whether $Pconv \leq N \times Pb$, where Pconv is the output power indicated by the generator detection signal, where N is the number indicated by the indication signal, and where Pb is a predetermined threshold power value that is smaller than a rated value of output power of each of the electricity converters of the electricity conversion device, (B2) when it is determined in (B1) that $Pconv \leq N \times Pb$, generating the converter control signals in such a way that, for the electricity converters that are detected to be in the normal state, a number (L) of the electricity converters takes part in the supply-to-output AC conversion, one of the electricity converters that take part in the supply-to-output AC conversion provides the output power of $Pconv-(L-1) \times Pb$ and each of the other one(s) of the electricity converters that take part in the supply-to-output AC conversion provides the output power of Pb, where L is a smallest integer greater than or equal to Pconv/Pb, and (B3) when it is determined in (B1) that $Pconv > N \times Pb$, generating the converter control signals in such a way that all of the electricity converters detected to be in the normal state take part in the supply-to-output AC conversion, and each of the electricity converters detected to be in the normal state provides the output power of Pconv/N.

9. The electricity management method of claim 8, further comprising:

(C) determining whether $Pconv \leq N \times Pa$, where Pa is the rated value of the output power of each of the electricity converters of the electricity conversion device;

(D) when it is determined in (C) that $Pconv > N \times Pa$, outputting an error signal for receipt by the generator controller, the error signal enabling the generator controller to detect the output power of the microturbine generator again to generate the generator detection signal;

wherein (C) is executed after execution of (A), (B) is executed when it is determined in (C) that $Pconv \leq N \times Pa$, and (A) is repeated after execution of (D).

* * * * *